United States Patent [19]

Linde

[11] 4,448,592

[45] May 15, 1984

[54] ADSORPTIVE METHOD FOR THE SEPARATION OF A GAS MIXTURE

[75] Inventor: Gerhard Linde, Grünwald, Fed. Rep. of Germany

[73] Assignee: Linde AG, Wiesbaden, Fed. Rep. of Germany

[21] Appl. No.: 409,019

[22] Filed: Aug. 17, 1982

[30] Foreign Application Priority Data

Aug. 18, 1981 [DE] Fed. Rep. of Germany ....... 3132572

[51] Int. Cl.³ ............................................. B01D 53/04
[52] U.S. Cl. .......................................... 55/68; 55/75; 55/179
[58] Field of Search ................... 55/25, 26, 58, 62, 68, 55/75, 179, 389

[56] References Cited

U.S. PATENT DOCUMENTS

| | | | |
|---|---|---|---|
| 2,080,578 | 5/1937 | Ray | 55/179 |
| 2,428,885 | 10/1947 | Luaces | 55/179 X |
| 2,739,664 | 3/1956 | Parks | 55/62 X |
| 2,918,140 | 12/1959 | Brooks | 55/62 X |
| 3,102,013 | 8/1963 | Skarstrom | 55/62 X |
| 3,149,934 | 9/1964 | Martin | 55/62 X |
| 3,710,547 | 1/1973 | Nelson | 55/58 |
| 3,986,849 | 10/1976 | Fuderer et al. | 55/25 |
| 4,011,065 | 3/1977 | Munzner et al. | 55/62 X |
| 4,026,680 | 5/1977 | Collins | 55/62 X |
| 4,259,091 | 3/1981 | Benkmann | 55/58 X |
| 4,299,595 | 11/1981 | Benkmann et al. | 55/21 |
| 4,386,945 | 6/1983 | Gardner | 55/58 X |

FOREIGN PATENT DOCUMENTS 2441447 9/1979 Fed. Rep. of Germany.

*Primary Examiner*—Robert H. Spitzer
*Attorney, Agent, or Firm*—Karl F. Ross; Herbert Dubno

[57] ABSTRACT

A method of recovering at least two product fractions each highly enriched in a respective component of a gas mixture containing at least such components are recovered by separating a stream of the mixture into at least two partial streams and passing this stream separately through respective beds of respective adsorbents and selectively retaining at least one component from each mixture so that the respective product fractions emerge from the adsorbents highly enriched in respective components of this mixture, each adsorbent for a particular one of the fractions has a composition that retains at least one component in which the other fractions is enriched.

9 Claims, 2 Drawing Figures

ADSORPTIVE METHOD FOR THE SEPARATION OF A GAS MIXTURE

FIELD OF THE INVENTION

My present invention relates to a method for the adsorptive separation of a gas mixture containing at least two components into at least two product fractions each of which consists of at least one component and, more particularly, to the adsorptive separation of a gas mixture generally into product fractions.

BACKGROUND OF THE INVENTION

A process in which a gas mixture is separated adsorptively into two components is disclosed in German patent document 24 41 447. In this system, the rectification of air into an oxygen-enriched product fraction and a product fraction consisting substantially completely of nitrogen is disclosed.

The adsorbent is a molecular sieve coke having a high capacity for oxygen.

During the adsorption phase the gas is passed through an adsorption bed charged with the molecular sieve and a product fraction is withdrawn which is enriched to greater than 99 vol. % with nitrogen. The adsorption is carried out at superatmospheric pressure and the desorption, yielding a gas fraction enriched to about 35 vol. % with oxygen, is effected by evacuation.

The process is carried out in at least two adsorbers with cyclic functional interchange thereof.

An important feature of this process is that only one of the components in the original gas mixture, namely air, is highly enriched in the corresponding product fraction. In this case, the highly enriched product fraction is that which contains nitrogen.

Similar processes have been proposed for other gas mixtures. For example, it is known to effect selective adsorption of individual components of various hydrocarbon mixtures with zeolitic molecular sieves. These processes utilize the varying selectivity of different molecular sieve types for various hydrocarbons.

For example, for the recovery of the lightest n-paraffins, namely, methane and ethane, the molecular sieve which is used is of the type 4A. For $C_3$ and for higher n-paraffins, molecular sieves of type 5A are used. For the selective recovery of $C_4$ and higher i-paraffins, molecular sieves of types 10X and 13X are selectively used because they preferentially retard the passage of these hydrocarbons.

With the aforementioned molecular sieve types for the rectification of hydrocarbon mixtures which contain more than two valuable components or components which are to be recovered, it has been possible heretofore in a single adsorption step only to recover one component in highly concentrated form while the other component, at best, is obtained with a significantly lower enrichment.

It is thus necessary to provide additional adsorptive separation stages to recover highly concentrated fractions for these other components.

Since a number of successive adsorption stages must be operated in cyclical functional interchanging relationship, the apparatus with its cascade of stages is comparatively expensive and difficult to operate and to maintain.

OBJECTS OF THE INVENTION

It is, therefore, the principal object of the present invention to both provide a process for the separation of components of a fluid mixture, and an apparatus for carrying out this process, which is more effective and economical than earlier methods and, more specifically, allows the recovery simultaneously of a number of highly enriched product fractions of different compositions.

Another object of this invention is to provide a method of separating gas mixtures which allows two or more highly enriched product fractions to be obtained in a single adsorptive stage.

It is still another object of this invention to provide an improved apparatus for the adsorptive separation of gas components.

SUMMARY OF THE INVENTION

These objects and others which will become apparent hereinafter are obtained, in accordance with the present invention in a method for the adsorptive separation of components of a gas mixture wherein the mixture is subdivided into a number of partial streams equal in number to the product fractions to be obtained and each partial stream during each adsorption phase is fed through a respective adsorption bed containing an adsorption agent or adsorbent of a composition and type selected to increase the concentration in the respective partial stream of a respective component of the original mixture or group of components of the original mixture, the enriched components of the fraction being different and the components or group of components which are held back by the respective adsorbents being likewise different for the respective partial streams.

A single adsorption stage can be utilized, therefore, to produce a plurality of highly enriched product fractions and indeed product fractions so enriched in the respective different components as not to require cascaded or subsequent adsorption steps to achieve the high enrichment.

Since it is possible with the principles of the invention to obtain practically any number of desired highly enriched product fractions during each adsorption phase cycle of each adsorption bed, the apparatus which is required is greatly simplified.

The adsorbents are so selected that in each adsorption bed at least one component passed by the other adsorption bed is preferably retained.

Of course, since it is possible and even desirable in some cases that each of the adsorbent beds retain at least one component, in addition, in common with the component adsorbed by the other bed, each or one of the adsorbent beds may be a mixed bed containing two adsorbents with respective selectivities for the components to be held back.

The process of the invention is preferably so carried out that at least two identically prepared, cyclically interchangeable systems of adsorbent beds are provided, one of these systems having a number of parallel-connected adsorbent beds equal in number to the product fractions to be obtained.

At least one of the systems of parallel connected adsorbent beds is operated in the adsorption phase while another system of parallel connected adsorbent beds is operated in the desorption phase.

While the present invention is applicable to conventional adsorber operations wherein heating is utilized to liberate adsorbed components and sparging gases may be utilized to drive traces of adsorbed components from the adsorbent beds, it has been found to be preferable to operate with the pressure swing adsorption process (see the commonly assigned U.S. Pat. Nos. 4,259,091, issued May 31, 1981 and 4,299,595, issued Nov. 10, 1981 and copending applications, Ser. Nos. 068,499 filed Aug. 21, 1979 (now abandoned) and 305,797, filed Sept. 25, 1981, and the references mentioned or cited herein).

Of course, in accordance with the invention, it is possible to use more than two cyclically switchable systems of adsorber beds and, instead of operating with a single desorption phase, operating them with two or more desorption and adsorption phases. In this case, initially the gas mixture which is found in the interstices of the bed can be withdrawn (with a composition close to that of the unrectified gas mixture) and only thereafter is a desorbate removed with a high concentration of the retarded component or components, undiluted by the gas within the interstices and which has not been subjected to adsorptive phenomena.

An apparatus for carrying out the method of the invention can comprise at least two cyclically interchangeable adsorbers, each of which can comprise a system of adsorption beds, each adsorption bed having a respective adsorbent different from the adsorbent of the other beds, so that the beds are traversed by the respective partial streams of the gas.

Each system may be contained in a single adsorber housing, thereby reducing the cost of the apparatus.

Each adsorber housing can thus be provided with means for subdividing the same into respective compartments, each compartment containing a respective adsorbent and being traversed by a partial stream of the incoming gas.

The adsorber housing can thus be provided with a single inlet and a chamber communicating with the respective compartments for distributing the partial streams thereto, each compartment having a respective outlet for the product fractions enriched in the respective compartment.

In a preferred embodiment of the invention, the housing is an adsorbent column which can be provided with adsorption beds to either side of a central portion of the housing. When partitions are utilized to subdivide the housing into respective compartments, in accordance with the invention, the partitions may be perforated, may extend transversely to the housing axis and may be sealed to the walls of the housing.

To prevent breakthrough of a retained component during the adsorption stage, it has been found to be advantageous to provide the adsorbent packings or beds at different levels in the respective compartments, the heights of the beds depending upon the quantities of the respective components to be retained in the beds. For example, when the gas mixture has two components which are to be retained from the respective partial streams, the height of the bed for the component of greatest concentration or amount will be proportionally greater than the height of the bed for the other retained component.

Best results are obtained when both adsorbents or all of the adsorbents are maximally saturated before switchover to the desorption phase without breakthrough at any of the adsorbent beds.

When two product streams are to be recovered, it has been found to be advantageous to provide the adsorber beds as axially extending columns in a respective columnar housing to either side of a substantially central inlet for the gas mixture to be rectified and gas outlets at the opposite ends of this housing.

With this construction, no special means is necessary to subdivide the incoming gas into two partial streams, inasmuch as the incoming gas will inherently subdivide between flows in the opposite axial directions.

The invention has been found to be particularly effective in the separation of air. In this case, the adsorbent of one of the adsorption beds is preferably a nitrogen retaining zeolitic molecular sieve while the other adsorption bed is an oxygen retaining carbon molecular sieve. From a single unit, therefore, it is possible to obtain an oxygen-containing product fraction with an extremely high oxygen concentration as well as a product fraction containing practically pure nitrogen, utilizing a single adsorber housing or structure. Of course, when continuous supplies of oxygen and nitrogen are desirable, at least two adsorbers which are functionally interchangeable, may be utilized. In neither case, however, is it necessary to provide adsorber beds in cascade.

In the recovery of two product streams, such as nitrogen and oxygen, from air as a gas stream to be separated it is also highly advantageous to draw the desorbate simultaneously from both beds, i.e. from a location between the two beds. The central zone of the housing between the two beds can therefore be evacuated to draw desorbate fractions as a mixture of the two desorbates. This gas mixture can simply be vented to the atmosphere.

Of course, the invention is not applicable exclusively to air and can find particularly effective use in any gas separations in which molecular sieves or adsorber systems have been proposed heretofore. I have found it to be particularly advantageous for the separation of hydrocarbon mixtures as well.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
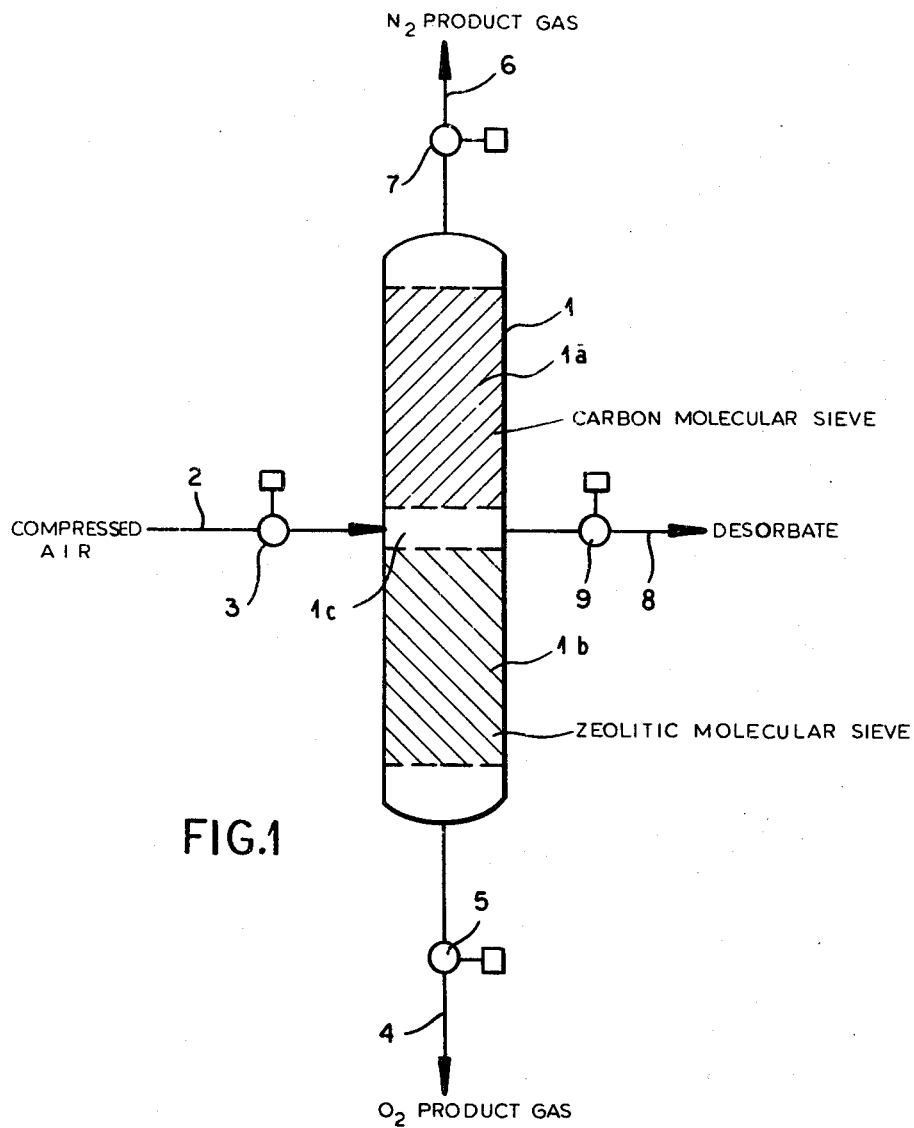
FIG. 1 is a diagrammatic axial cross sectional view of a double-flow adsorber in accordance with the invention for a PSA air separation installation.

FIG. 1 shows an adsorber 1, in accordance with the present invention, which can be paired with an identical but functionally interchangeable adsorber so that, while the adsorber 1 of FIG. 1 is operated in an adsorber mode, the other adsorber will be operated in a desorption mode and vice versa.

The adsorber 1 is shown to be of a double-flow type, i.e. to be divided into two adsorption beds 1a, 1b, each comprising an adsorbent different from the other and separated from one another at a region 1c, the latter forming a chamber into which the gas mixture to be separated is fed.

Each adsorbent is selected to retain or retard one of the components of the gas mixture and to pass at least one other component such that the components which are passed by the adsorber beds are different. Thus, if the gas stream contains N components, the gas stream emerging from one of the beds may have the composition (N−a) while the gas stream emerging from the other bed has the composition (N−b) where a and b are components retained by the second bed and the first bed, respectively. During desorption, a mixture of the components a and b is withdrawn.

The bed 1a is provided with a valve 7 and an outlet 6 for one of the components while the bed 1b is provided with a valve 5 and an outlet 4 for the other of the product streams.

A feed line 2 delivers the gas stream to be separated via a valve 3 to the compartment 1c and an outlet pipe 8 can be connected to a suction source (not shown) and is provided with a valve 9 for desorption.

The operation of the embodiment of FIG. 1 will be more readily understood in connection with the following example:

10,000 m³/h (S.T.P.) of compressed air is fed via line 2 and valve 3 at a pressure of about 4 bar to the chamber 1c and is distributed into equal fractions to the beds 1a and 1b.

The adsorbent in bed 1b is a zeolitic molecular sieve of type 5A or 13X and is a nitrogen retaining molecular sieve.

The bed 1a is an oxygen retaining carbon-based molecular sieve.

Although the molecular sieve adsorbents in both beds are shown to be of the same height, in practice, the heights of the two beds will depend upon the proportions of the two components to be retained. For example, if both molecular sieves retain the preferentially adsorbed gases equally, the height of the nitrogen retaining molecular sieve would be approximately four times greater than that of the oxygen retaining molecular sieves. However, since the carbon-based molecular sieve is significantly less efficient than the zeolitic molecular sieve, this difference in affinity for the adsorbed components must be taken into consideration. When air is separated, therefore, the packing height of the carbon containing molecular sieve will be greater than that of the zeolitic molecular sieve.

Approximately 500 m³/h (S.T.P.) of highly enriched oxygen (95% purity) is recovered at line 4 via valve 5 at a pressure of 4 bar and about 3,000 m³/h (S.T.P.) of practically pure nitrogen (99% purity) is recovered at a pressure of 4 bar via line 6 and valve 7.

Thus, with the apparatus of FIG. 1, both high purity oxygen and nitrogen can be produced with comparatively low investment costs, a single air compressor and a minimum number of switchover valves. The number of domed ends of adsorbers is also reduced so that the overall operating and capital costs are minimized by comparison with earlier systems capable of delivering both high purity oxygen and high purity nitrogen.

The subsequent desorption which is effected by reducing the pressure in the bed to about 1 bar, i.e. by opening the valve 9 and closing the valves 5, 7 and 3, discharges a desorbate [6,500 m³/h (S.T.P.)] of a gas mixture of about 23% oxygen into the atmosphere.

Desorption efficiency is improved by evacuation in the manner described.

When the system is utilized for the adsorptive separation of hydrocarbon components, the desorbate is, of course, not discharged into the atmosphere but rather may be subjected to a further adsorption operation.

Figure 2:
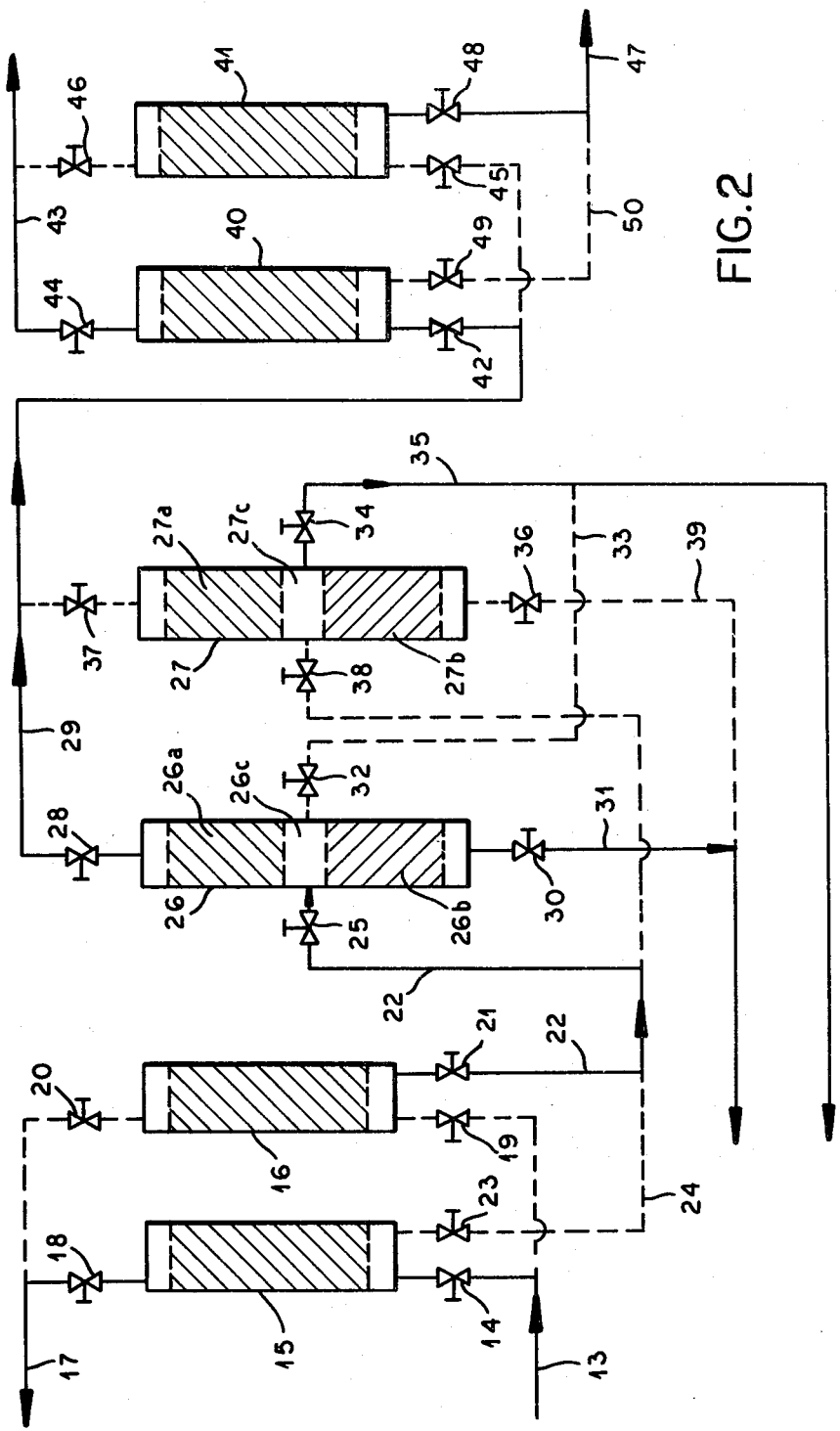
FIG. 2 is a flow diagram illustrating an adsorber system for the separation of purge gases of ammonia synthesis.

FIG. 2 shows an apparatus for the separation of a purged gas from an ammonia synthesis plant.

Via line 13 and valve 14, 10,000 m³/h (S.T.P.) of purged gas from an ammonia synthesis plant at a pressure of about 40 bar is delivered to a pressure swing adsorption plant having at least two adsorbers 15 and 16.

The purged gas has the following compositon:
$H_2$ = 6,300 m³/h (S.T.P.)
$N_2$ = 2,100 m³/h (S.T.P.)
Ar = 800 m³/h (S.T.P.)
$CH_4$ = 800 m³/h (S.T.P.)

The adsorbers 15 and 16 operate to remove the impurities (nitrogen, argon and methane) from the hydrogen by retaining these impurities on molecular sieves. The adsorbers are of the zeolitic molecular sieve type, preferably type 5A.

The passage of the purged gas through the adsorber 15 removes these impurities and delivers 5,000 m³/h (S.T.P.) of pure hydrogen via line 17 and valve 18. During this operation, the adsorber 16, previously used for this purpose, is desorbed. Thus, valves 14 and 18 of adsorber 15 are open for the adsorption phase while valves 19 and 20 of the adsorber 16 are closed for the desorption phase. Valve 21, however, is opened and the desorbate passes via line 22 to a double flow adsorption column 26. The desorbate forming the gas mixture delivered to this column consists of 1,300 m³/h $H_2$ (S.T.P.), 2,100 m³/h (S.T.P.) $N_2$ and 800 m³/h (S.T.P.) Ar and 800 m³/h (S.T.P.) $CH_4$.

Naturally, after desorption, the adsorbers 15 and 16 are functionally interchanged by corresponding opening and closing of the valves 14, 18, 19, 20, 21 and 23.

The desorbate from adsorber 15 passes via the open valve 23 and line 24 into either the adsorber 26 or the adsorber 27 which is identical to and functionally interchangeable therewith.

From time to time it may be advantageous to remove an adsorber completely from the cycling sequence and regenerate the adsorber bed therein. For this purpose, at least three adsorbers may be used for each operation.

The functionally interchangeable adsorbers 26 and 27 which are fed via valves 25 and 38 centrally as described in connection with the embodiment of FIG. 1, function as pressure swing adsorbers (PSA) and are of the double-flow type, each having an upper adsorption bed 26a, 27a with a zeolitic molecular sieve (type 5A or 13X) preferentially retaining nitrogen and methane.

The lower adsorbent beds 26b, 27b, can be modified carbon molecular sieves which preferentially retain argon.

The desorbate gas, from the adsorber 15 or 16 undergoing desorption, is admitted at a pressure of about 8 bar in the region 26c or 27c between the adsorption beds 26a, 26b or 27a, 27b of the adsorber 26, 27 in the adsorption mode and is distributed between the two adsorption beds in opposite directions in respective partial streams.

At the valve 28 via line 29, 600 m³/h (S.T.P.) $H_2$ and 400 m³/h (S.T.P.) Ar are carried off while, via valve 30 and line 31, 600 m³/h (S.T.P.) $H_2$ and 1,050 m³/h (S.T.P.) $N_2$ are withdrawn at a pressure of about 7,5 bar.

When the adsorber 27 is operated in an adsorption mode, equivalent streams are carried away via the valves 37 and 36 (and line 39) respectively.

While adsorber 26 operates in an adsorption mode, the adsorber 27 is desorbed. To this end, the valves 36, 37 and 38 are closed and valve 34 is opened to carry away the desorbate at a reduced pressure, e.g. 1.5 bar. The desorbate fraction has a composition of 100 m³/h (S.T.P.) $H_2$, 1050 m³/h (S.T.P.) $N_2$, 400 m³/h (S.T.P.) Ar and 800 m³/h (S.T.P.) $CH_4$ and can be used as a fuel gas for whatever purpose may be desired.

In general, therefore, when the adsorber 26 or 27 operates in an adsorption mode, the valves 25, 28, 30 or 38, 36, 37 are opened and the valves 32 and 34 are closed. When either operates in a desorption mode, its valve 32 or 34 is opened and the other valves 25, 28, 30 or 38, 37, 36 are closed. Valve 32 blocks flow through line 33 when this valve is closed.

The product fraction obtained via line 29 consisting predominantly of hydrogen and argon may be subjected to further separation in another pressure swing adsorption apparatus comprising adsorbers 40 and 41. Each of these adsorbers may be provided with a modified carbon molecular sieve. The gas to be separated is delivered via valve 42 or 45 to the adsorber 40 or 41 which is operating in the adsorption mode while the other adsorber is in a desorption mode. The argon is adsorbed so that via line 43 and either valve 44 or 46 from the head of the adsorber, 580 m$^3$/h (S.T.P.) of pure hydrogen at a pressure of 7 bar can be obtained and returned to the ammonia synthesis process.

The other adsorber, e.g. adsorber 41, is subjected during this period to the desorption phase, i.e. valves 45 or 46 are closed while valve 48 is opened. A reduced pressure is provided in lines 50 and 47, e.g. a pressure of 1.2 bar, so that the desorbate, 400 m$^3$/h (S.T.P.) of argon and 20 m$^3$/h (S.T.P.) of hydrogen is discharged. Valve 49 is opened for applying the reduced pressure to absorber 40.

This system thus gives rise to a product gas, i.e. pure hydrogen, which can be used directly for recycling to ammonia synthesis and to a desorbate fraction which can be used as a fuel gas. The gas recovered by lines 50 and 47 can be further purified to recover hydrogen therefrom or utilized as a fuel gas or combined therewith.

I claim:

1. A method of recovering at least two product fractions each highly enriched in a respective component of a gas mixture containing at least two such components, said method comprising the steps of:
   - separating a stream of said mixture into at least two partial streams; and
   - passing said stream separately through respective beds of respective adsorbents different from one another and selectively retaining at least one component from each of said mixture so that respective product fractions emerge from said adsorbents highly enriched in respective components of said mixture, each of said adsorbents for a particular one of said fractions having a composition such that it retains at least one component in which another of said fractions is enriched.

2. The method defined in claim 1 wherein all of the adsorbents for all of the partial streams for a respective stream of said mixture are received in a single adsorber housing and a single adsorber unit and operate as parallel beds thereof, at least two adsorber units with respective parallel beds of corresponding adsorbents being provided and operated in functionally interchanging relationship wherein one set of parallel beds is operating in an adsorption mode while another set of parallel beds is operating in a desorption mode.

3. The method defined in claim 1 wherein said mixture is air and said adsorbents are respectively a zeolitic molecular sieve preferentially retaining nitrogen and a carbon molecular sieve preferentially retaining oxygen.

4. The method defined in claim 1 wherein said adsorbents are selected to retain different components of a purge gas of an ammonia synthesis plant.

5. An adsorption system for separating a gas mixture of an incoming gas stream into product fractions rich in respective components of said mixture, said apparatus comprising at least two functionally interchangeable adsorbers adapted respectively to operate alternately in an adsorption mode and a desorption mode, each of said adsorbers comprising a plurality of parallel beds of different adsorbents each adapted to retain at least one component of said mixture and pass a product fraction rich in at least one other component of said mixture whereby said product fractions of the adsorbents of each adsorber are rich in different components of said mixture.

6. The apparatus defined in claim 5 wherein the adsorbents of each adsorber are formed in beds of different heights.

7. The apparatus defined in claim 5 wherein each adsorber is a column and said adsorbents are provided on opposite axial sides of said column in respective compartments with a chamber being disposed between said compartments, said mixture being fed to said chamber and partitioning itself between said compartments, means being provided at opposite axial ends of the adsorber for discharging respective product fractions from said compartments.

8. The apparatus defined in claim 7 for the separation of air into product fractions rich in oxygen and nitrogen wherein one of said adsorbents is a zeolitic molecular sieve preferentially retaining nitrogen and the other of said adsorbents is a carbon molecular sieve preferentially retaining oxygen.

9. The apparatus defined in claim 8, further comprising a desorbate duct connected to said chamber between said beds.

* * * * *